Feb. 13, 1940. G. H. HAGERMAN 2,189,868
APPARATUS FOR FORMING EXTERNAL THREADS IN A WORKPIECE
Filed Oct. 8, 1938 4 Sheets-Sheet 1
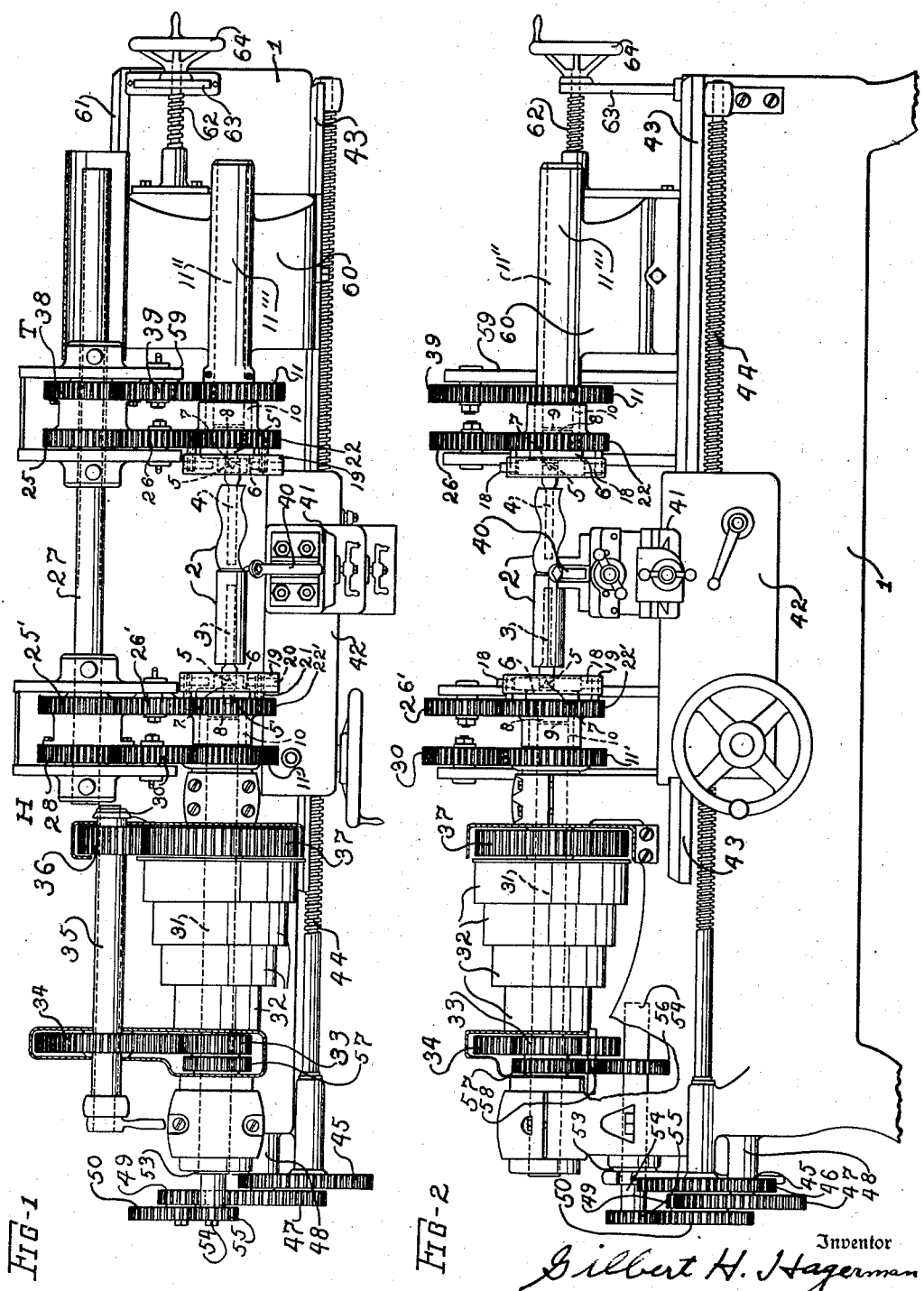
Inventor
Gilbert H. Hagerman
By Staley & Melch
Attorney Feb. 13, 1940.    G. H. HAGERMAN    2,189,868
APPARATUS FOR FORMING EXTERNAL THREADS IN A WORKPIECE
Filed Oct. 8, 1938    4 Sheets-Sheet 2
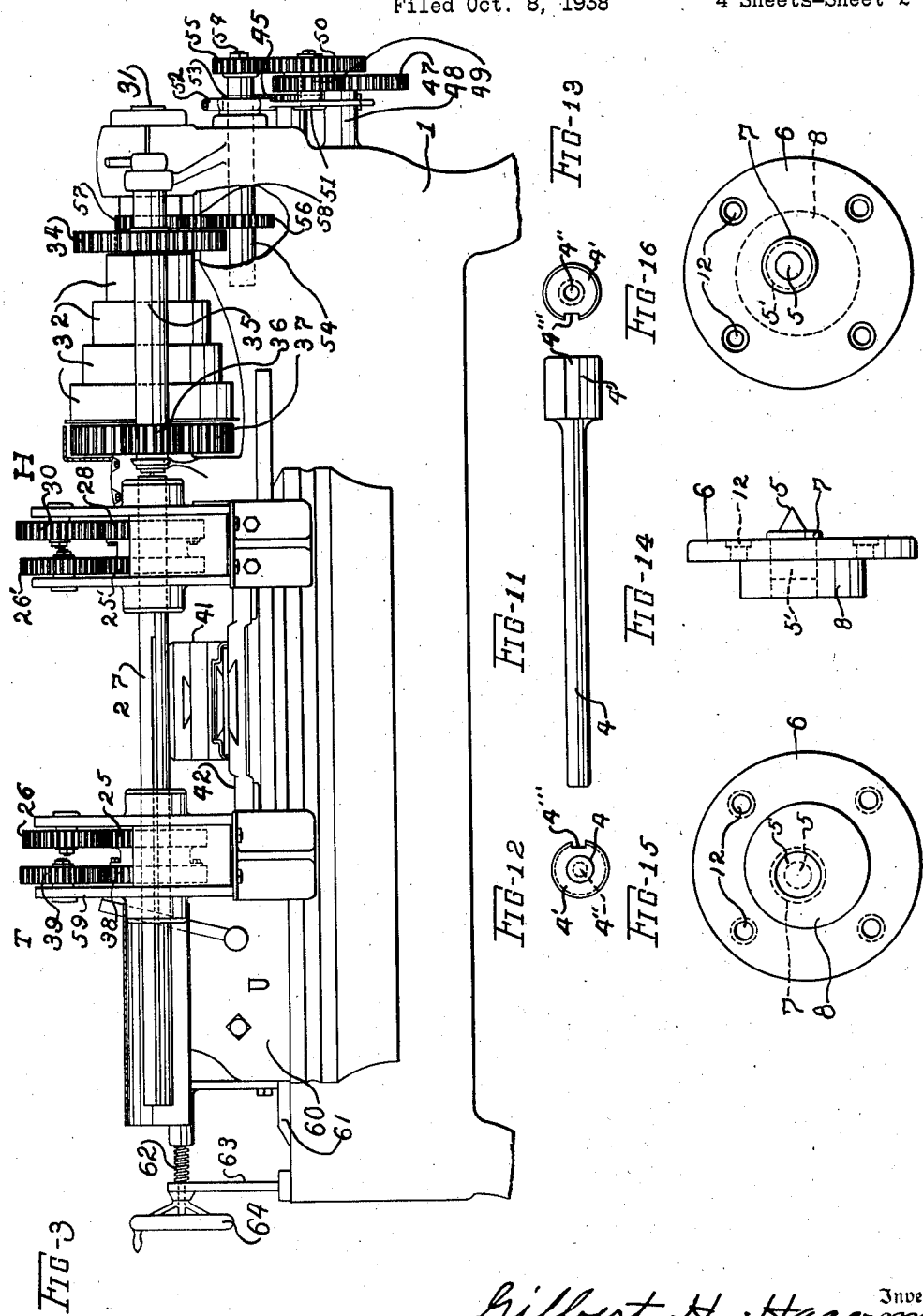
Inventor
Gilbert H. Hagerman
By Staley & Welch
Attorneys

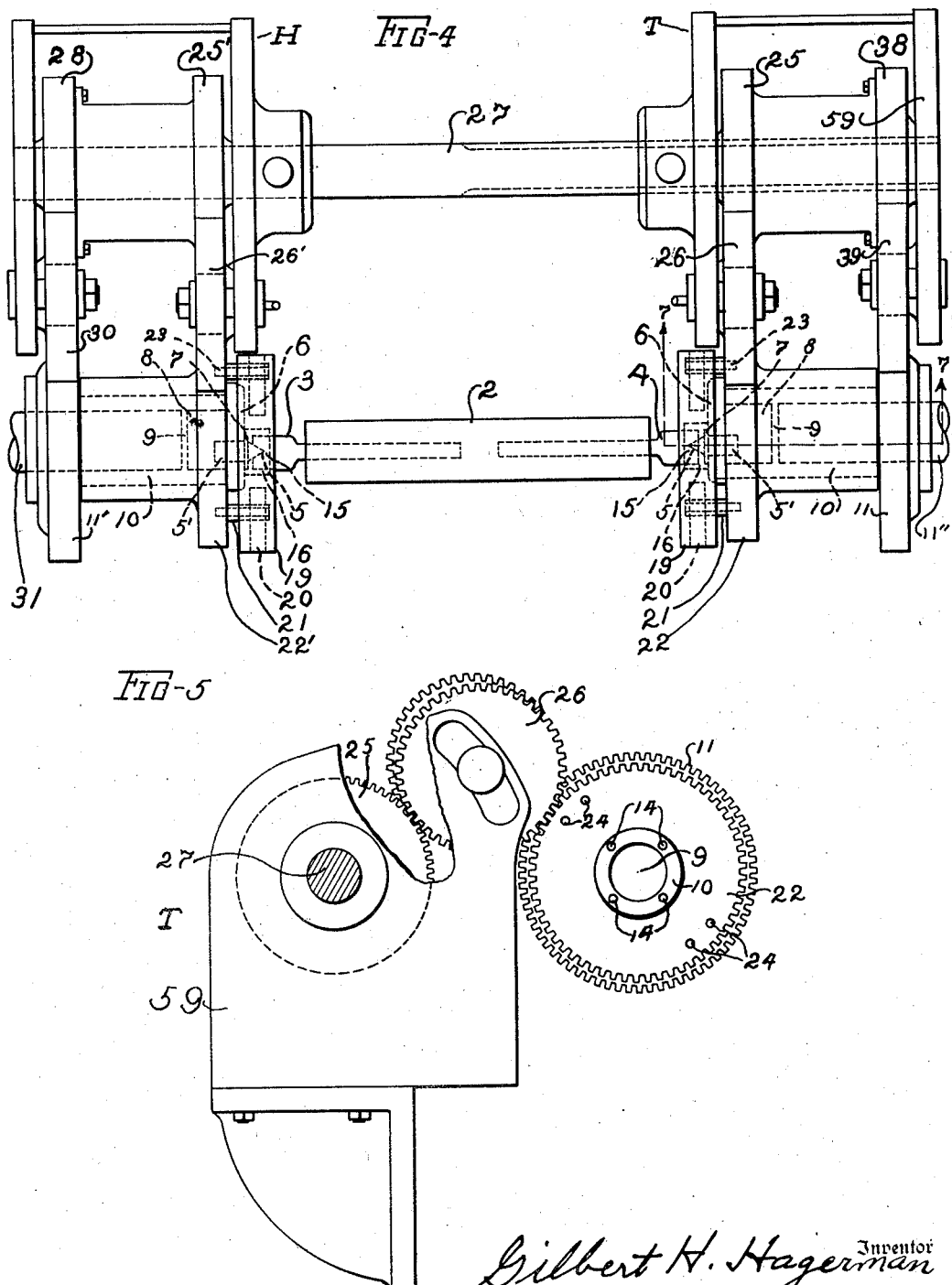

Feb. 13, 1940.  G. H. HAGERMAN  2,189,868
APPARATUS FOR FORMING EXTERNAL THREADS IN A WORKPIECE
Filed Oct. 8, 1938    4 Sheets-Sheet 4
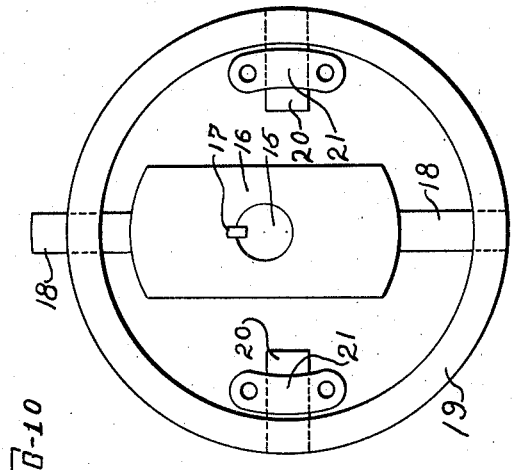
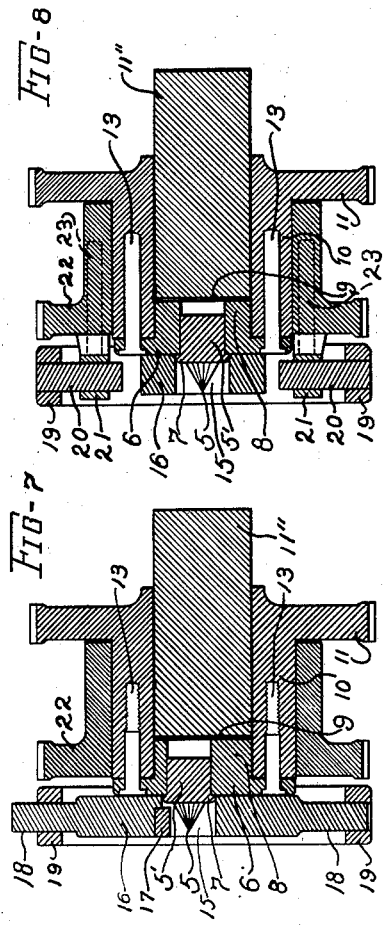
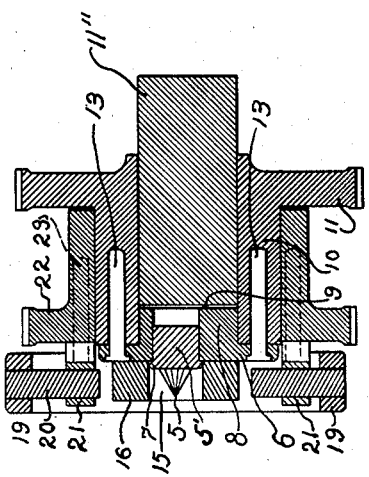
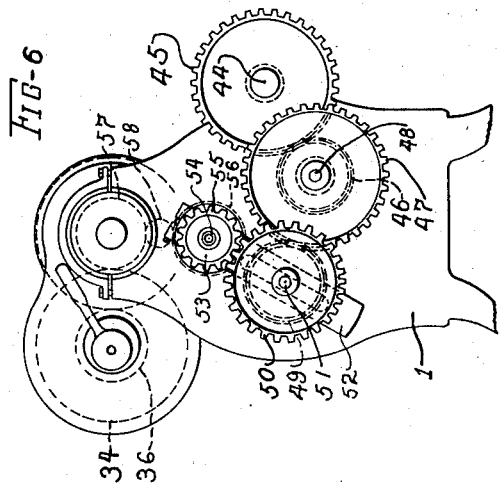
Gilbert H. Hagerman Inventor
By Staley & Welch
Attorneys Patented Feb. 13, 1940

2,189,868

UNITED STATES PATENT OFFICE 2,189,868

APPARATUS FOR FORMING EXTERNAL THREADS IN A WORKPIECE

Gilbert H. Hagerman, Dayton, Ohio, assignor, by mesne assignments, to Societe d'Exploitation des Brevets Moineau, Luxembourg, Luxembourg Application October 8, 1938, Serial No. 233,994

2 Claims. (Cl. 82—18)

This invention relates to an apparatus for manufacturing one of the two helical members employed in the gear mechanism described in United States Letters Patent No. 1,892,217, dated December 27, 1932, to R. J. L. Moineau, and United States Letters Patent No. 2,028,407, dated January 21, 1936, to the same inventor, the particular helical member for which this invention is adapted being what will be hereafter termed the "rotor" as distinguished from the stator, and on which the helical threads are turned on the exterior surface thereof.

In those two United States patents there is described a gear mechanism particularly adapted for pumps for fluids, consisting of two helical members disposed one within the other and, as before stated, this invention relates to a method and mechanism for carrying out the method such as a lathe for turning the rotary element of the two helical members.

One of the objects of the invention is to provide an apparatus for forming a helical rotor of the character described which will be simple in construction, economical in manufacture, and effective for the purpose for which it is designed.

A further and more specific object is to provide a mechanism in the form of a lathe which will provide for rotating the workpiece, which in the present case is the rotor referred to, upon its own axis, and also provide for moving the axis of the workpiece in a circular direction with relation to the cutting tool, so that the circular path will intersect the cutting point of the tool, this circular path being imparted to the axis of the workpiece by eccentric devices, the movement of the cutting tool being a uniform feeding movement in the direction of the length of the workpiece.

A further and more specific object of the invention is to provide a mechanism whereby a predetermined number of revolutions of the workpiece on its own axis will be imparted thereto with relation to the feed of the cutting tool corresponding to one pitch distance of the final helical form of the workpiece and also a predetermined number of circular movements of the axis of the workpiece imparted thereto during the same movement of the cutting tool; the movements which are imparted to the workpiece and its axis being so proportioned by means of suitable gearing and the feeding movement of the cutting tool being such that the desired helical shape to the workpiece will be applied thereto.

A further object of the invention is to provide an apparatus for forming spiral threads on the workpiece in which a cutter movable in the direction of the axis of the workpiece is employed, consisting in providing an arrangement whereby the workpiece is brought into effective cutting relation with the cutter on a helical line extending but once about the workpiece during a given distance of travel of the cutter.

In the accompanying drawings:

Fig. 1 is a top plan view of an apparatus in the form of a lathe which is employed for carrying out the invention.

Fig. 2 is a side elevation of the forward side of the machine or that side upon which the operator stands.

Fig. 3 is an elevation of the opposite or rear side of the machine.

Fig. 4 is an enlarged top plan view of some of the parts shown in Fig. 1.

Fig. 5 is an enlarged end elevation partly broken away and shown in section of the tail stock.

Fig. 6 is an end elevation of the machine looking from the left in Fig. 2.

Fig. 7 is a detail sectional view on the line 7—7 of Fig. 4, showing the parts in one position of operation.

Fig. 8 is also a section on the line 7—7 of Fig. 4, showing the parts in a different position of operation.

Fig. 9 is also a section on the line 7—7 of Fig. 4, showing the parts in another different position of operation.

Fig. 10 is an end elevation of a portion of one of the universal driving mechanisms for the mandrel which supports the work-piece.

Fig. 11 is an elevation of one of the mandrels which support the workpiece.

Fig. 12 is a view of one end thereof.

Fig. 13 is an end view of the other end thereof.

Fig. 14 is a side elevation of one of the eccentric centers for the mandrel.

Fig. 15 is an end view of one end of the same.

Fig. 16 is a view of the other end of the same.

In forming the workpiece there is imparted thereto a rotary movement upon its own axis with relation to the cutting tool and also a movement in a circular path with relation to the cutting tool, resulting in the workpiece being presented to to the action of the cutter on a helical line extending but once about the workpiece for a predetermined distance of movement of the cutter, this line being a helical one. The means for imparting the rotary movement to the workpiece upon its own axis will be first described as follows:

All of the parts are supported upon a suitable base indicated at 1. The workpiece which is indicated at 2 is mounted upon a pair of mandrels indicated at 3 and 4, one of these mandrels which is the tail stock mandrel being shown in detail in Figs. 11, 12 and 13. The stem of each one of these mandrels is inserted in a longitudinal bore in the workpiece 2 as shown in dotted lines in Figs. 1, 2 and 4, and each has a head 4' provided with a conical depression 4" together with a keyway 4'''.

The machine, which is a lathe, has in the usual way a head stock and a tail stock, the mechanisms of which are substantially alike so that the description will be confined mostly to but one of these stocks, the one shown and described in detail being the tail stock. The head stock is shown in a general way at H and the tail stock shown in a general way at T.

The conical recess of each mandrel receives the conical pin 5 which is carried by a disk 6, the point being formed on a plug 5' which is pressed with a tight fit in the disk 6, and is eccentrically positioned therein, this plug having a flange 7 concentric with the point 5 for a purpose to be described. The disk 6 also has a boss 8 which is inserted in an opening 9 in an extended portion 10 of a gear 11, the disk being provided with suitable openings 12 to receive bolts 13 which are screwed into openings 14 in the extended portion 10 of the gear 11. The connection of each disk 6 of the respective stocks which carry the points 5 with the respective gears 11 will be hereinafter more specifically referred to in connection with the description of the means for imparting a movement of the workpiece in a circular direction with respect to the cutting tool.

Each of the mandrel heads has been described as having a keyway 4'''. When each mandrel is positioned upon one of the points 5 it is inserted through an opening 15 in a block 16 which has a key 17 which enters the keyway 4''' so as to connect the mandrel with said block. This block has a pair of oppositely extending trunnions 18 which are slidably mounted in apertures in a ring 19 which in turn has oppositely extending trunnions 20 which project at right-angles to the trunnions 18 and are slidably mounted in bearing caps 21 which are bolted to a gear 22 by bolts 23 which are screwed into openings 24 in the gear.

The gear 22 is rotated from gear 25 through the idler gear 26 (Figs. 1, 3, 4 and 5), said gear 25 being driven by a shaft 27, the gear being keyed to the shaft so as to be longitudinally movable thereon for a purpose to be explained later. The shaft 27 is connected with a gear 28 in the head stock H and the gear 28 is driven from a gear 11' through an idler 30, the gear 11' being connected with a power spindle 31 having a cone pulley 32 to which power is applied from any suitable source through a belt (not shown), four of these pulleys being shown in the present case, whereby a change of speed of the mechanism may be effected.

The description of the drive so far has been with reference to the tail stock. As before stated, the head stock and tail stock are constructed substantially alike, the mandrel of the head stock H being connected with a gear 22' in the same manner that the mandrel of the tail stock is connected with the gear 22. This gear 22' is rotated from a gear 25' through an idler gear 26', the gear 25' being connected by bolting with the gear 28.

In addition to the change of speed afforded by a cone pulley 32, a further change of speed may be effected by a conventional back shaft assembly, a portion of which is shown in Figs. 1 and 2 consisting of a gear 33 fast to the spindle 31, a gear 34 fast to a tubular shaft 35, a gear 36 fast to the shaft 35 and a gear 37 which is adapted to be thrown into or out of driving relation with the spindle by clutch mechanism which is not shown as it is common in change of speed mechanism of this character.

By the construction so far described it will be seen that each mandrel which carries the workpiece will be rotated upon its own axis, so that the workpiece will be likewise rotated.

It has been heretofore stated that in addition to rotating the workpiece upon its own axis an eccentric movement is imparted to the axis thereof with relation to the cutter, this eccentric movement being in a circular path in a vertical plane at right-angles to the axis of the workpiece. It has been heretofore explained that each mandrel is connected with a block 16 which has a universal movement. As shown best in Figs. 7, 8 and 9 the flange 7 which is carried by the plug 5' projects into the opening 15 in the block 16 just behind the key 17. As shown best in Figs. 15 and 16 this flange is eccentrically arranged with respect to the disk 6 so that as the flange is rotated from the gear 11, an eccentric movement in a circular path will be imparted to the block 16 and hence to the mandrel connected therewith and to the workpiece. The gear 11 in the tail stock is driven from the gear 25 through the medium of a gear 38 and idler 39, the gear 11 being connected with a shaft 11' which is rotatably mounted in a sleeve 11''' extending from the slide 60. While the corresponding gear 11' of the head stock is rotated as before stated through its connection with the spindle 31, the ratio of gearing being such, of course, that these gears 11 and 11' rotate at the same speed.

The cutting tool is indicated at 40, this being an ordinary sharp-pointed lathe tool. The tool head 41 is adjustably mounted upon a carriage 42 and has the usual adjusting means whereby the tool may be adjusted to or from the circular path of movement of the axis of the workpiece. The carriage 42 is mounted upon a way 43 on the base 1 and provision is made for imparting to the carriage a uniform or timed movement in a direction parallel with the axis of the workpiece through the medium of a lead screw 44 which is rotated as follows: Connected with the lead screw at the left-hand end of the machine as viewed in Figs. 1, 2 and 6 is a gear 45 which meshes with a pinion 46 which is connected with a gear 47, the pinion and gear being rotatably mounted upon a stub shaft 48. The gear 47 meshes with a pinion 49 which is connected with a gear 50, the pinion and gear being loosely journalled upon a short shaft 51 which is carried by an adjustable bracket 52. The upper end of this bracket is pivotally mounted upon a tubular extension 53 projecting from the frame and that tubular extension has rotatably mounted therein a shaft 54 which has fast thereto a gear 55 which meshes with the gear 50. The shaft 54 extends into the base and is journalled in suitable bearings therein and has fast thereto a gear 56 which is driven from a gear 57 through an idler 58. The gear 57 is connected with the spindle 31 and is driven thereby.

In order to adapt the machine for turning workpieces of different lengths, the tail stock is made adjustable to or from the head stock. The gearing of the tail stock heretofore described is mounted in and carried by housing 59. The housing is connected with a slide 60 which slides upon the way 43 and another way 61 on the upper side of the base 1. Swivelly connected with the slide is a screw 62 which is rotatably mounted in a standard 63 supported from the base and provided with a hand wheel 64 whereby when the screw is rotated the entire tail stock assembly may be moved to or from the head stock.

It should be explained at this point that the gearing heretofore described is so proportioned and synchronized that the workpiece is rotated one additional time upon its own axis to the number of times its axis moves in its circular path during the travel of the cutting tool one pitch distance of the threads of the workpiece which would result, due to the proportion and synchronization of the gearing, that during the travel of the cutting tool through one pitch distance the workpiece has been brought into effective cutting relation with the cutter on a helical line which extends but once about the workpiece. This in effect means that the workpiece has been rotated but one complete revolution with relation to the cutting tool during the travel of the tool one pitch distance of the threads of the workpiece.

For instance, in a workpiece of a certain size, 961 revolutions will be imparted to the workpiece upon its own axis to 960 revolutions of the axis of the workpiece in its circular path during the cutting of one pitch distance. This results in a series of successive slightly spiral cuts being imparted to the workpiece, each cut beginning at a point slightly in advance of the preceding cut. Each cut starts slightly over the crown of the threads and grows deeper as the axis of the workpiece moves toward the tool in its circular path to the full depth of the threads and then grows shallower as the axis of the workpiece moves away from the tool in its circular path until it reaches approximately its starting point.

When it is desired to turn a workpiece of a different size from that previously operated upon by the machine, after the tail stock has been properly adjusted with relation to the head stock to receive the mandrels it will also be necessary to change the disk 6 of each stock carrying the eccentric points 5 so as to give a greater or less movement to the axis of the workpiece in a circular path according to the size of the workpiece. It will also be necessary to change the gear 45 which drives the lead screw 44 in order to vary the extent of travel of the carriage 42 which supports the cutting tool, it being understood that the gearing which drives this lead screw is so proportioned that a predetermined movement will be imparted to the tool for a certain number of predetermined rotations of the workpiece not only upon its own axis but also in a circular path.

Having thus described my invention, I claim:

1. In a machine for forming a workpiece with spiral threads, said machine having a head stock and a tail stock, a mandrel for each stock to support the workpiece to rotate therewith, a disk associated with each stock having an eccentric centering pin to receive the corresponding mandrel, means for rotating said disk, a universal device for each stock consisting of a rotatable member and a block slidably mounted in said rotatable member, means for rotating said rotatable member comprising a slidable connection between said means and said rotatable member, eccentric means on said centering pin carrying disk to impart movement to said block in said disk, means for connecting the corresponding mandrel with said block, and a cutter having a uniform feeding movement parallel with the axis of rotation of said workpiece.

2. In a machine for forming a workpiece with spiral threads, said machine having a head stock and a tail stock and a mandrel for each stock to support the workpiece to rotate therewith, a disk associated with each stock having an eccentric centering pin to receive the corresponding mandrel, means to rotate said disk, an eccentrically positioned flange on said disk, universal devices associated with each stock consisting of a ring and a block slidably mounted in said ring, means to connect the corresponding mandrel with said block, a rotatable gear, means to slidably connect said ring with said rotatable gear, and a cutter having a uniform feeding movement parallel with the axis of rotation of said workpiece.

GILBERT H. HAGERMAN.